(12) United States Patent
Banning-Geertsma (10) Patent No.: US 6,856,909 B2
(45) Date of Patent: Feb. 15, 2005

(54) DETECTING A BOUNDARY IN A FORMATION

(75) Inventor: Erik Jan Banning-Geertsma, Rijswijk (NL)

(73) Assignee: Shell Oil Company, Houston, TX (US)

(*) Notice: Subject to any disclaimer, the term of this patent is extended or adjusted under 35 U.S.C. 154(b) by 0 days.

(21) Appl. No.: 10/472,614
(22) PCT Filed: Mar. 14, 2002
(86) PCT No.: PCT/EP02/03073
§ 371 (c)(1), (2), (4) Date: Sep. 18, 2003
(87) PCT Pub. No.: WO02/075364
PCT Pub. Date: Sep. 26, 2002

(65) Prior Publication Data
US 2004/0107052 A1 Jun. 3, 2004

(30) Foreign Application Priority Data
Mar. 20, 2001 (EP) .............................. 01201033

(51) Int. Cl.$^7$ .............................. G01V 3/20; G01V 3/38
(52) U.S. Cl. .................................................. 702/7
(58) Field of Search .............................. 702/7, 11, 12, 702/13; 324/339, 343

(56) References Cited

U.S. PATENT DOCUMENTS

| | | |
|---|---|---|
| 3,838,335 A | 9/1974 | Miller |
| 3,921,061 A | 11/1975 | Miller |
| 4,786,874 A | 11/1988 | Grosso et al. |
| 5,038,108 A | 8/1991 | Lessi et al. |
| 6,727,705 B2 * | 4/2004 | Frey et al. .................. 324/338 |

FOREIGN PATENT DOCUMENTS

| | | | |
|---|---|---|---|
| FR | 2489531 | 3/1982 | ............ G01V/3/20 |
| GB | 636075 | 4/1950 | |

OTHER PUBLICATIONS

International Search Report dated Aug. 8, 2002, p. 5.
Telfort, W.M., et al: Applied Geophysics 1990, end Edition. Cambridge University Press, pp. 522–530, Chapter 8.

* cited by examiner

*Primary Examiner*—Donald McElheny, Jr.

(57) ABSTRACT

Detecting in an earth formation a boundary between first and second formation regions having different resistivities, wherein the first formation region is traversed by a wellbore, using a logging tool provided with a number of electrodes including a monitoring electrode, the method having:

a) selecting a location of the logging tool in the wellbore;

b) assuming a position of the boundary relative to the selected location, selecting outside the wellbore a target point relative to the selected location, and selecting a target value for a selected parameter in the target point;

c) assuming a model wherein the logging tool in the wellbore is surrounded by a homogeneous formation having the resistivity of the first formation region, and determining how two of the electrodes have to be energized in order that in the target point the selected parameter has the target value;

d) selecting a monitoring parameter at the monitoring electrode;

e) placing the logging tool at the selected location in the wellbore;

f) determining a detection value of the monitoring parameter resulting from energizing the two electrodes as determined in step c); and, g) interpreting the detection value of the monitoring parameter in order to detect the boundary.

13 Claims, 4 Drawing Sheets

DETECTING A BOUNDARY IN A FORMATION

The present application claims priority on European Patent Application 01201033.6 filed on 20 Mar. 2001.

FIELD OF THE INVENTION

The present invention relates to a method of detecting in an earth formation a boundary between two formation regions. More particular, the method relates to detecting a boundary between formation regions having different electrical resistivity, wherein an electrical logging tool is used that is present in a wellbore that extends into at least one of the formation regions.

BACKGROUND OF THE INVENTION

Due to developments in well drilling and engineering technology there is an increasing need for methods that can provide very specific information about the earth formation surrounding the wellbore. The location of a boundary between formation regions having different properties is important for the geologist or the well engineer. It is of particular interest to be able to detect the presence of such a boundary near the wellbore. Such information can be used in order to steer the drilling accordingly. For example, modern drilling technology allows drilling of a horizontal well into a substantially horizontal oil-bearing formation region. An oil-bearing formation can for example be sandwiched between water-bearing formation regions, and in such a case it would be highly desirable to steer the drill bit such that no boundary between the oil-bearing and a water-bearing formation region is crossed.

Other examples in which detection of a boundary between formation regions is desired include the determination of optimum locations to obtain a core sample, or the determination of locations in the wellbore where casing is required.

A boundary in an earth formation generally separates formation regions that differ substantially in at least one characteristic property. In order to detect the boundary by a measurement, the measurement has to be sensitive to the change in the characteristic property. The present invention relates to the situation that the characteristic property is the electrical resistivity, which will in the specification and the claims be simply referred to as resistivity.

Measurements of the resistivity are used in the art for characterizing an earth formation along a wellbore, and such measurements are commonly performed by logging tools, either while or after drilling the wellbore. For example, oil-bearing formation regions generally exhibit a higher resistivity than water-bearing regions. A sudden change in the measured resistivity at a certain location in the wellbore is therefore a typical indication that at this location the wellbore crosses a boundary between formation regions. It is desirable, however, to detect the boundary at a distance in the formation, without the need for the boundary to actually cross the wellbore.

Several types of logging tools for measuring resistivity are known in the art. A particular type are so-called resistivity logging tools which comprise a number of electrodes. These logging tools are operated by emitting electrical currents from one or more electrodes through the wellbore into the formation, and the resulting electrical potential (or an electrical current) is measured at certain electrodes on the logging tool. Determining a resistivity from these measurements is done in a so-called inversion process.

U.S. Pat. No. 3,838,335 discloses a method for determining the presence of and the distance to a horizontal subsurface boundary, using a logging tool in a vertical wellbore. The method comprises emitting a current from a single current electrode on the logging tool, and measuring the potential at two potential electrodes, which are arranged at equal distance (in the order of more than 100 m) above and below the current electrode. The potential electrodes have a length of about one tenth of their distance from the current electrode. A horizontal boundary ahead of the logging tool causes a potential difference between the potential electrodes, which is used to determine the depth of the horizontal boundary.

U.S. Pat. No. 5,038,108 discloses a method for determining from inside a wellbore the distance to a boundary which extends parallel to the wellbore. In the known method, a logging tool having a single emitter electrode is used, and resistivity measurements are performed using a plurality of detector electrodes disposed at increasing distances from the emitter electrode. The results of the measurements are compared with previously obtained reference curves, thereby providing the distance to the boundary.

SUMMARY OF THE INVENTION

The present invention relates to the situation that prior knowledge about the resistivity of the formation region surrounding the wellbore is available. The resistivity can for example be known from separate measurements in the same wellbore or in an adjacent wellbore, or from an estimate based on geological data.

The present invention relates further to the situation, that another formation region is present in the vicinity of the wellbore. The relative orientation of the boundary between the two formation regions with respect to the wellbore is often known or can be estimated on the basis of other data available, for example from seismic measurements. The two formation regions will in the specification and in the claims be referred to as the first and second formation regions, wherein the first formation region is the region surrounding the wellbore at the location of a logging tool. The first formation region is separated from the more remote second formation region by a boundary, which boundary has the certain relative orientation with respect to the wellbore. The relative orientation can in general be parallel, perpendicular, or any other orientation. The first formation region has a known resistivity $\rho_1$ and the second region has a different resistivity $\rho_2 \neq \rho_1$.

There is a need for an efficient method for the detection of such a boundary.

It is therefore an object of the present invention to provide a method for detecting from a distance the presence of a boundary between formation regions having different resistivities.

Applicant has found that a boundary can be detected from a distance by using target points in the formation surrounding the tool, which are chosen in dependence of the known or expected relative orientation between the logging tool and the boundary. The term target point will in the specification and in the claims be used to refer to a predetermined position in a formation at which under certain conditions a selected target value of an electrical property can be provided. A target value of an electrical property at a target point can be provided if the logging tool is energized in a specific way. The term energized is used in the specification and the claims to refer to providing certain electric parameters, for example current, current density, or potential, at one or more electrodes of the logging tool.

How the logging tool needs to be energized in order to provide a target value of an electric parameter at a target point can be determined, if all pertinent parameters about the tool and its immediate surroundings are known. To this end a model is required. A simple model is that of a logging tool of known geometry in an infinitely large and homogeneous formation having a known resistivity. Another model can additionally include the wellbore of finite diameter filled with a fluid of known resistivity, for example a drilling mud, and can suitably also include the length of the wellbore and the position of the logging tool in the wellbore. The latter model is sufficient in many practical cases in order to determine how the tool needs to be energized if the nearest boundary to the second formation region is at sufficiently long distance from the tool, for example 5 times the length of the logging tool (the maximum distance between any two electrodes) away, or more. In this case, the first formation region can be regarded as an infinitely large formation region.

An even more sophisticated model can be used to describe the situation wherein a resistivity boundary is present at a distance of a few meters or less from the logging tool in the wellbore.

Further, an electric parameter at a monitoring electrode of the tool can be selected as a monitoring parameter, and it can be determined which value this additional parameter has if the logging tool is energized in a surrounding according to the selected model.

The present invention can for example be used to efficiently determine the distance from a logging tool to a boundary in the adjacent earth formation. It can also be used to determine that a logging tool, that is progressing through the wellbore, has reached a predetermined distance from such a boundary.

BRIEF DESCRIPTION OF DRAWINGS

The invention will now be described by way of example with reference to the accompanying drawings, wherein.

DETAILED DESCRIPTION OF THE PREFERRED EMBODIMENT

Reference is made to the book 'Applied Geophysics', Second Edition, by W. M. Telfort, L. P. Geldart, R. E. Sheriff, Cambridge University Press 1990, in particular pages 522–529. In the book, basic aspects of the theory commonly used to describe electrical parameters in an underground formation due to an energised electrode are described. In particular it is shown how the effect of a boundary in the vicinity of the electrode can be taken into account by using an electrical mirror image. Before discussing the present invention the main points of the theory will be briefly summarized, and in this discussion terms and symbols will be used that are adapted to the invention.

In a homogeneous formation having the resistivity $\rho$ (unit: Ohm.m) the electrical potential $\Phi$ (unit: V) at a distance r (unit: m) from a point electrode emitting a current I (unit: A) is given by $$\Phi = \frac{I\rho}{4\pi r}. \tag{1}$$

Note, that the potential $\Phi$ is selected such that it vanishes for an infinitely large distance r, and the same is true for all other potentials referred to in the specification and in the claims unless otherwise specified.

Figure 1A:
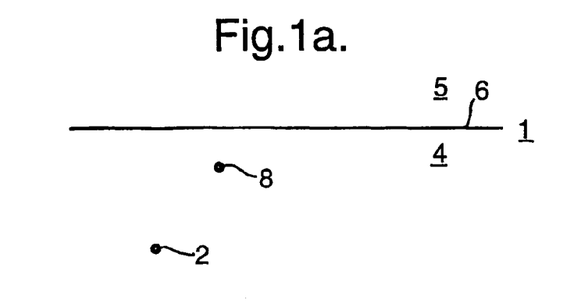
FIG. 1 shows schematically the principle of mirroring for a point electrode in an underground formation.
Figure 1B:
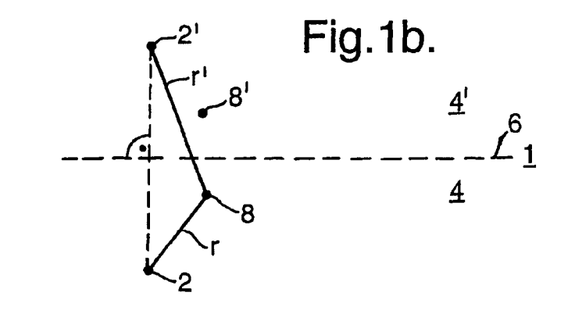

Reference is made to FIGS. 1a and 1b. FIG. 1a shows schematically an underground formation 1, wherein a current emitting point electrode 2 is located in a first formation region 4 having the known resistivity $\rho_1$. A second formation region 5 having the resistivity $\rho_2$ is present in the formation 1 near the electrode 2, separated from the first formation region 4 by the boundary 6.

The electrical potential at point 8 in the first formation region 4 shall be determined. To this end, the boundary is replaced by a mirror electrode 2' emitting a current of suitably chosen magnitude in the formation region 4' having the same resistivity $\rho_1$ as the first formation region 4. This is shown in FIG. 1b, wherein the position of the boundary 6 is now indicated by a dashed line. The mirror electrode 2' is located at position of the geometrical mirror image of electrode 2 with respect to the boundary 6.

The potential $\Phi$ generated by electrode 2 at point 8 in formation 4 is given by:

$$\Phi_8 = \frac{\rho_1}{4\pi}\left(\frac{I}{r_8} + \frac{\gamma I}{r'_8}\right), \tag{2}$$

wherein $$\gamma = \frac{\rho_2 - \rho_1}{\rho_2 + \rho_1}, \tag{3}$$

$r_8$ is the distance between the electrode 2 and point 8, $r_8'$ is the distance between the mirror image 2' of electrode 2 and point 8, equal to the distance between mirror point 8' of point 8 and electrode 2, and I is the current emitted by electrode 2.

The other variables have the same meaning as given before. The dimensionless variable $\gamma$ is referred to as the reflection coefficient or resistivity contrast.

The potential in point 8 according to equation 2 is a sum of two parts, $$\Phi_8 = \Phi_{8,hom} + \Phi_{8,boundary}. \tag{4}$$

The first part, $\Phi_{8,hom} = \rho_1 I/4\pi r_8$ equals the potential due to electrode 2 in an infinite homogeneous formation, and the second part, $\Phi_{8,boundary} = \rho_1 \gamma I/4\pi r_{8'}$ corresponds to the effect of the boundary which can be considered as the potential due to the mirror electrode 2'. Note further, that $$\Phi_{8,boundary} = \gamma \Phi_{8',hom}, \tag{5}$$

i.e. the part of the potential at point 8 due to the effect of the boundary is equal to the potential that electrode 2 would cause in the mirror point 8' in a homogeneous infinite formation of resistivity $\rho_1$, wherein the latter potential is scaled by the factor $\gamma$.

Figure 2A:
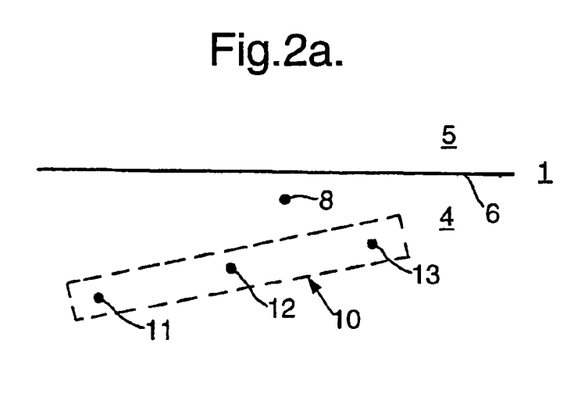
FIG. 2 shows schematically the principle of mirroring for a logging tool comprising point electrodes in an underground formation.
Figure 2B:
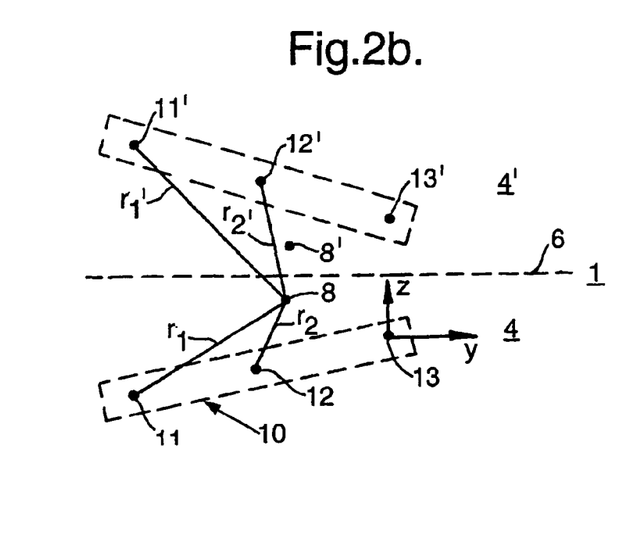

Reference is now made to FIGS. 2a and 2b, showing schematically a logging tool 10 comprising three point electrodes 11, 12, 13 in an underground formation 1, which is formed by first and second underground formation regions 4 and 5, separated by the boundary 6. Like reference numerals are used throughout the description and in the claims to refer to similar objects. The logging tool 10 is shown directly in the first formation region 4, according to a model wherein no wellbore is present.

The first and second electrodes 11 and 12 are energized to emit currents $I_1$ and $I_2$, respectively. The effect of the boundary on the electrical parameters in point 8 can be calculated by using mirror electrodes 11', 12', and the mirror point 8'.

The resulting total potential $\Phi_{8,tot}$ at point 8 can be calculated as the sum of the potentials $\Phi_{8,1}$ due to the first electrode 11 and $\Phi_{8,2}$ due to the second electrode 12, wherein $$\Phi_{8,i} = \frac{\rho_1}{4\pi}\left(\frac{I_i}{r_{8,i}} + \frac{\gamma I_i}{r'_{8,i}}\right), \tag{6}$$

and wherein i=1,2 corresponding to electrodes 11 and 12, respectively, $r_{8,i}$ is the distance between point 8 and the respective electrode i, $r_{8',i}$ is the distance between mirror point 8' and the respective electrode i, equal to the distance between point 8 and the respective mirror electrode.

Other symbols have the same meaning as given before.

In analogy with equation 4, $\Phi_{8,tot}$ is also composed of two parts, due to the homogeneous contribution and to the effect of the boundary (mirroring), $$\Phi_{8,tot}=\Phi_{8,hom}+\Phi_{8,boundary}, \tag{7}$$

wherein $\Phi_{8,hom}$ is the potential in point 8 due to the electrodes 11 and 12 in a homogeneous infinite formation of resistivity $\rho_1$; $\Phi_{8,hom}$ is also referred to as the homogeneous potential in point 8; and $\Phi_{8,boundary}$ is the potential in point 8 due to the effect of the boundary 6.

Equation 5 is also analogously applicable.

We now select instead of point 8 a point on the tool itself, namely at the location of the point electrode 13 (which in FIG. 2b coincides with the origin of the cartesian coordinate system such that the electrode 13 is at x=y=z=0, the boundary at x=y=0, z=d and the mirror image 13' of the electrode 13 on the z-axis at x=y=0, z=2d. Note, that the x-axis in FIG. 2b points out of the paper plane). The total potential at the location of the point electrode 13 is:

$$\Phi_{13,tot}=\Phi_{13,hom}+\gamma\Phi_{13',hom}. \tag{8}$$

Figure 3:
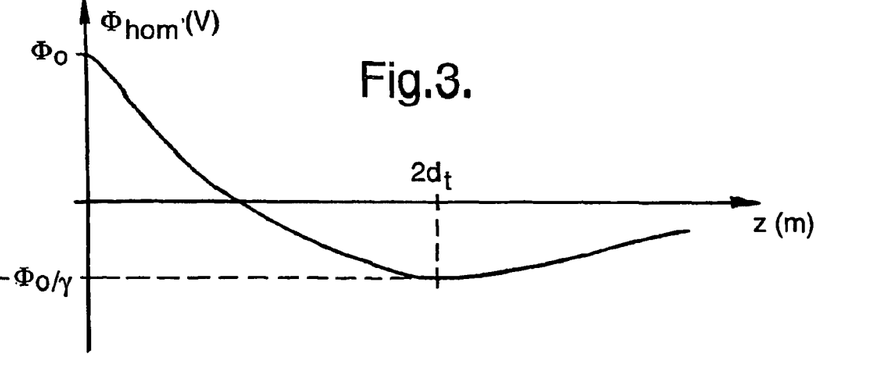
FIG. 3 shows schematically a first example of the potential in an infinite homogeneous formation along the z-axis of FIG. 2.

Reference is made to FIGS. 2 and 3, and at the hand of the Figures some of the basic features of the present invention will now be discussed. FIG. 3 shows an example of the potential $\Phi_{hom}$ along the z-axis of FIG. 2 due to energized first and second electrodes 11 and 12, for a homogeneous and infinite formation of resistivity $\rho_1$. It will be clear, that in such a formation it holds $\Phi_{hom}=\Phi_{tot}$. Further, the two currents $I_1$ and $I_2$ at the electrodes 11 and 12 can be selected such that the potential $\Phi_{hom}$ has predetermined values at two selected points in such a formation, say at x=y=z=0 (on the electrode 13), and at a target point (x=y=0, z=$2d_t$) in the homogeneous formation. If both $\rho_1$ and $\rho_2$ are known (and therefore the resistivity contrast $\gamma$), the currents $I_1$ and $I_2$ can for example be selected such that $$\Phi_{13,hom}=\Phi_{hom}(x=y=z=0)=\Phi_0;$$

$$\Phi_{13',hom}=\Phi_{hom}(x=y=0, z=2d_t)=-\Phi_0/\gamma, \tag{9}$$

wherein $\Phi_0$ is a selected potential value.

If the tool is energized by the same currents $I_1$ and $I_2$ in the vicinity of a boundary, the total potential at the electrode 13, $\Phi_{13,tot}$, will differ from the homogeneous potential $\Phi_{13,hom}$. The value of $\Phi_{13,tot}$ can in principle be determined by means of a suitable measurement at the electrode 13. Electrode 13 is therefore also referred to as a monitoring electrode. The superscript 'mon' will in the following be used when referring to the potential at the monitoring electrode, $\Phi^{mon}=\Phi_{13}$.

If the boundary is in the x-y plane as shown in FIG. 2b, the total potential at the monitoring electrode 13 is given by equation 8.

In conjunction with equation 9, the total potential at the monitoring electrode 13 will vanish if and only if the boundary is at the distance z=$d_t$ from the electrode 13, such that the target point (x=y=0, z=$2d_t$) coincides with the position of the mirror electrode 13'. In this way, a potential measurement at the monitoring electrode 13 can be used to detect a boundary. In particular, if a zero total potential is measured under the above conditions it can be concluded that the boundary is present at distance $d_t$.

If only $\rho_1$ is known, at least the presence of a boundary can be detected in the following way. A value for $\rho_2$ (and therefore $\gamma$) can be chosen. If, using this value a zero potential can be determined at the monitoring electrode 13 it is clear that a boundary is present. However, if the chosen $\rho_2$ differs from the true value, the distance is not correctly determined in this way.

Figure 4:
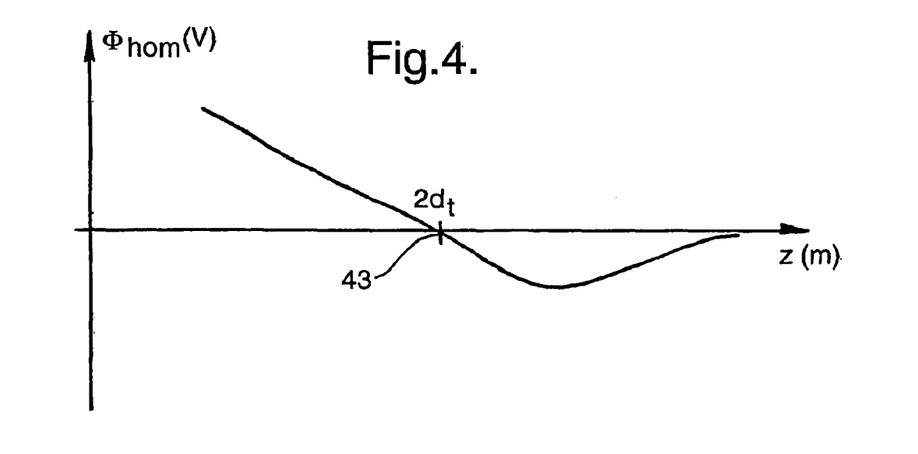
FIG. 4 shows schematically a second example of the potential in an infinite homogeneous formation along the z-axis of FIG. 2.

Reference is now made to FIG. 4, showing another example of the potential along the z-axis of FIG. 2, for a homogeneous and infinite formation of resistivity $\rho_1$. In this example, the potential at the target point (x=y=0, z=$2d_t$) is selected to be zero. The advantage of this form of the potential curve is that for the detection of the boundary at the distance $d_t$ the value of $\rho_2$ does not have to be known (the value of $\gamma$ then does not matter in the last term of equation 8).

Figure 5:
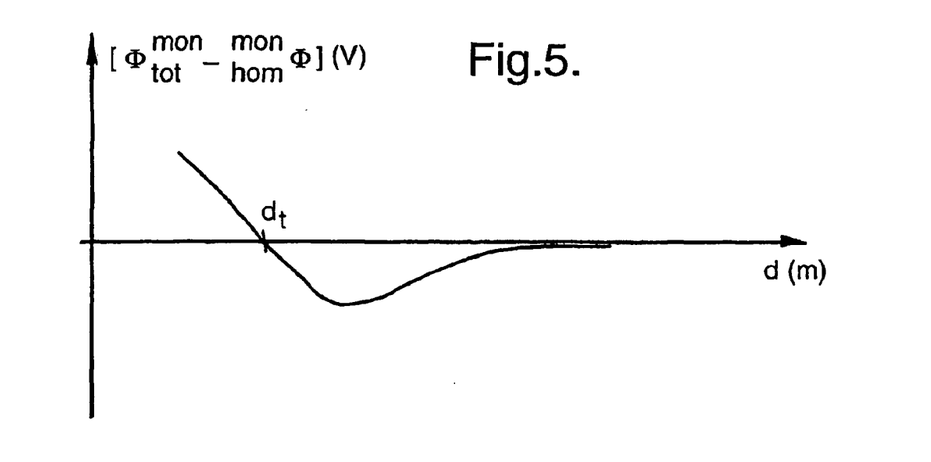
FIG. 5 shows schematically an example of the potential at the monitoring electrode as a function of the distance to a boundary.

Reference is made to FIG. 5, which illustrates how the boundary can be detected in the case that the homogeneous potential has been chosen as shown in FIG. 4. It is assumed that the electrodes are energized near a boundary, by the same currents as needed to provide the potential distribution of FIG. 4 in the homogeneous case. For this case FIG. 5 shows schematically the difference between the total potential $\Phi_{tot}^{mon}$ and the homogeneous potential $\Phi_{hom}^{mon}$ at the monitoring electrode 13, as a function of the distance d of the boundary from the monitoring electrode 13 along the z-axis in FIG. 2b. Clearly, at long distances 41, i.e. when the boundary is far away from the logging tool, $\Phi_{tot}^{mon}-\Phi_{hom}^{mon}$ equals zero. If the boundary is approached coming from long distances, $\Phi_{tot}^{mon}-\Phi_{hom}^{mon}$ first takes values different from zero, and then approaches zero again. When the zero-crossing 43 of $\Phi_{tot}^{mon}-\Phi_{hom}^{mon}$ is observed, it can be concluded that the monitoring electrode is located at the distance $d_t$ from the boundary, which is half the target distance. Note, however, that this only strictly holds under the assumption of point electrodes.

Figure 6:
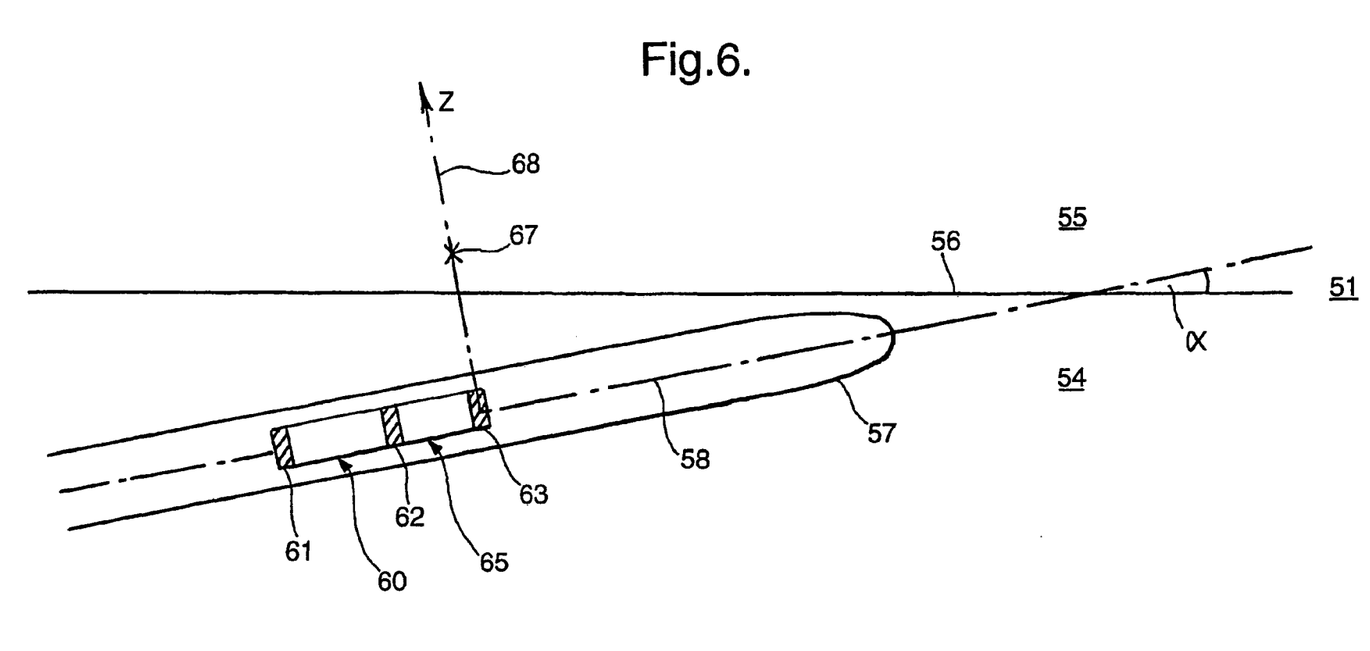
FIG. 6 shows schematically an embodiment of a logging tool in an underground earth formation, for operating according to the method of the invention.

Reference is made to FIG. 6, showing schematically a first embodiment of a logging tool for operating according to the method of the present invention. In the earth formation 51, the first and second formation regions 54 and 55 are separated by a boundary 56. The resistivity of the first formation region is known to be 10 Ohm.m. The first formation region 54 is traversed by a wellbore 57 having a diameter of 1.52 cm. A logging tool 60 can be moved longitudinally along and centered around the axis 58 of the wellbore 57. The logging tool 60 has a diameter of 1.02 cm and comprises three cylindrical metal electrodes 61, 62, 63. Electrode 63 is selected to be used as monitoring electrode. The axial distance between the centres of the first and second electrodes 61 and 62 is 98.30 cm, and the axial distance between electrodes 62 and 63 is 50.80 cm. As usual in the art, the electrodes 61 and 62 are connected to suitable energizing equipment (not shown), which is connected to a further electrode at or near the surface so as to allow to energize either one, or both, downhole electrodes 61, 62 as may be desired. The wellbore is filled with a drilling fluid having a resistivity of 0.02 Ohm.m. The angle α between the axis 58 of the wellbore 57 and the boundary 56 in this example is small enough to allow considering the boundary as quasi-parallel to the axis 58, say α=2.87 degrees.

A first example of the application of the method of the present invention will now be discussed. First, a location of the logging tool 60 in the wellbore 57 is selected, say location 65. It is then assumed that the boundary is oriented substantially parallel to the wellbore. A target point 67 is selected relative to the logging tool 60 at the location 65, say at a target distance of $2d_t$=254 cm from the monitoring electrode 63, on a line 68 perpendicular to the axis 58. The line 68 will in the following also be referred to as the z-axis, wherein z=0 is always at the location of the centre of monitoring electrode 63. The electrical potential is selected as parameter, and a target value of 0 V of the electric potential is selected for the target point 67.

Next, a model is assumed wherein the logging tool 60 in a wellbore, having the same diameter and resistivity of the drilling fluid as wellbore 57, is surrounded by an infinite and homogeneous formation having a resistivity of 10 Ohm.m which is equal to the resistivity of the first formation region 54. Using this model it can be determined that the target value of 0 V can be provided at the target point 67, if the first and second electrodes 61 and 62 are energized according to Table 1.

The values in Table 1 have been calculated by solving the Laplace equation for the assumed model. This was done in a numerical simulation of the static electric field using proprietary software. The software is based on a three-dimensional finite difference method.

TABLE 1

Example of energizing currents and the potentials at the first and second electrodes according to a homogeneous model.

| electrode | potential (V) | current (A) |
|---|---|---|
| 1st electrode 61 | 7.02 | 0.39 |
| 2nd electrode 62 | −6.68 | −0.46 |

It shall be clear that the target value can be also provided if the potentials and currents given in Table 1 are scaled by a common factor.

Figure 7:
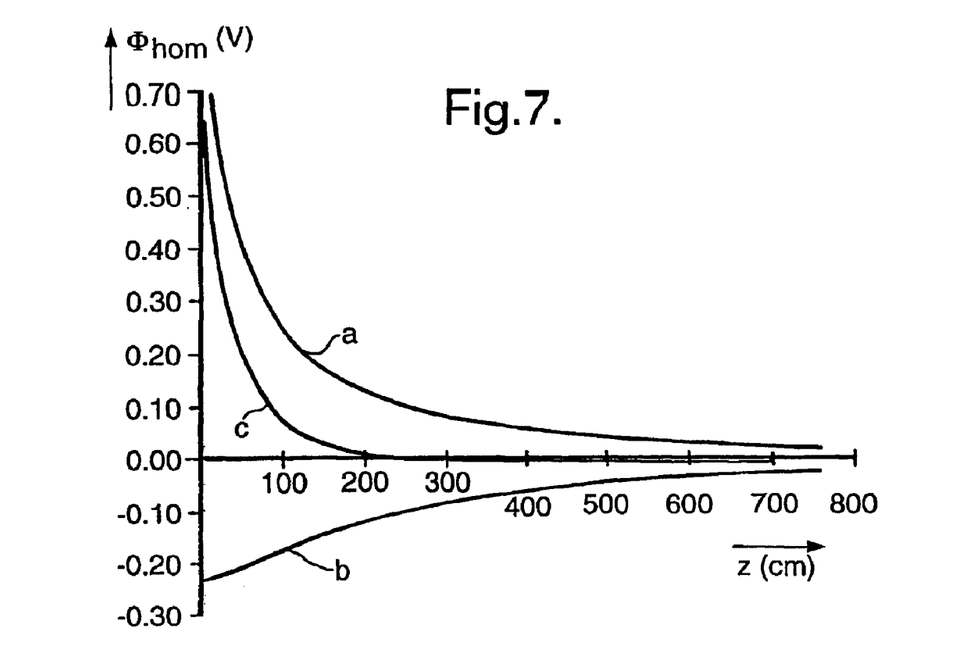
FIG. 7 shows schematically an example of the calculated potential in a homogeneous earth formation as a function of the distance from the monitoring electrode along the z-axis in FIG. 6, for the cases that (a) electrode 61 alone, (b) electrode 62 alone, or (c) both electrodes simultaneously are energized.

FIG. 7 shows the calculated potential $\Phi_{hom}$ (in V, on the ordinate) in the formation, as a function of the distance from the monitoring electrode along the z-axis in FIG. 6, for the cases that (a) electrode 61 alone, (b) electrode 62 alone, or (c) both electrodes simultaneously are energized as given in Table 1 in a homogeneous formation according to the assumed model. It can be seen that for curve (c) the potential is zero at the target point, 254 cm from the electrode 63.

Returning to the discussion of the first example of the method of the present invention with reference to FIG. 6, the potential at the monitoring electrode 63 is selected as the monitoring parameter.

It can be advantageous to determine also the reference value $\Phi_{hom}^{mon}$ of this potential for the case that the electrodes 61 and 62 are energized according to Table 1. This can be done by calculations, or experimentally by energising the tool at a location in the wellbore 57 where the surroundings of the tool correspond to the used model (in particular the nearest boundary needs to be sufficiently far away, for example 5 times the length of the logging tool) and by measuring the potential at the monitoring electrode.

Then, the logging tool is placed at the selected location 65 in the wellbore. The electrodes 61 and 62 are energized simultaneously at that location by emitting currents according to Table 1, and the potential at the monitoring electrode is measured, which is referred to as the detection value. If the detection value differs from the reference value it can be concluded that a boundary is in the vicinity of the logging tool. This is further illustrated in FIG. 8.

Figure 8:
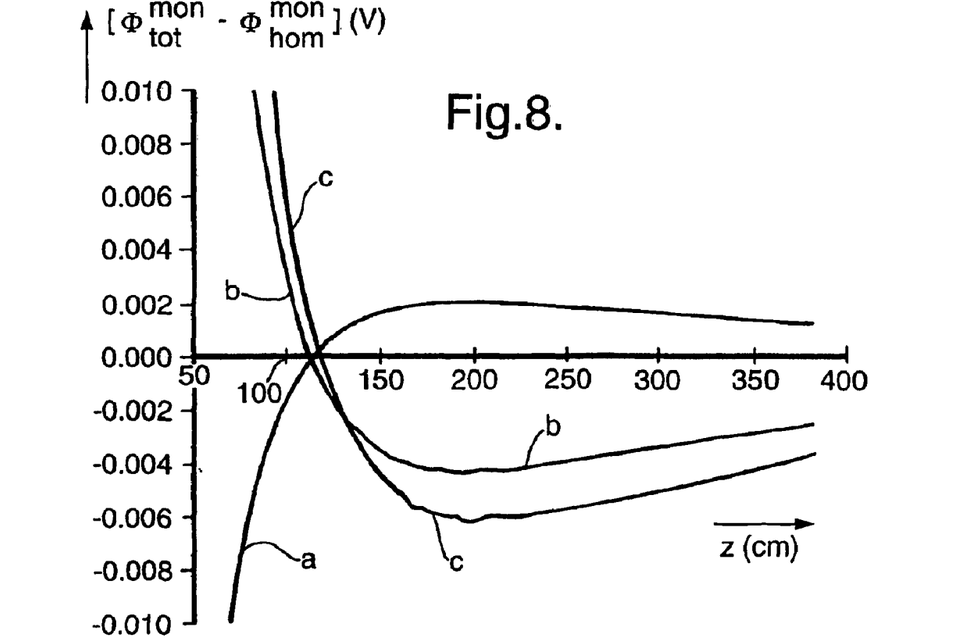
FIG. 8 shows schematically an example of the calculated potential at the monitoring electrode 13 in FIG. 6, in dependence on the distance to the boundary 56, for three different values of the resistivity $\rho_2$ in the second formation region 55.

FIG. 8 displays the results of numerical simulations of the potential at the monitoring electrode if the boundary 56 in FIG. 6 is present near the logging tool, and if the tool is energized by the same currents at the electrodes 61 and 62 as given in Table 1. The potential at the monitoring electrode 63 is shown (on the ordinate) as the difference $\Phi_{tot}^{mon} - \Phi_{hom}^{mon}$ between the detection value and the reference value, as a function of the distance d along the z-axis between the monitoring electrode and the boundary (on the abscissa). The simulations have been performed for the cases that the resistivity $\rho_2$ in the second formation region 55 is (a) 5 Ohm.m, (b) 50 Ohm.m, and (c) 200 Ohm.m.

The curves determined for all cases qualitatively agree with the curve shown in FIG. 5. It shall be clear that the fact that the overall shape of curve a) appears upside down with respect to curves b) and c) is due to the different relative magnitude of the resistivities in the first and second formation regions; in the case of curve a) it holds $\rho_1 > \rho_2$, whereas for curves b) and c) $\rho_1 < \rho_2$.

In all cases there is a zero-crossing of the potential $\Phi_{tot}^{mon} - \Phi_{hom}^{mon}$. If the zero-crossing can be observed experimentally, this can serve as a good indication for the position of the boundary. The zero-crossing in all three curves of FIG. 8 is observed at approximately the same distance d from the boundary, between 110 cm and 120 cm. This is in agreement with the discussion with reference to FIGS. 4 and 5. The zero-crossing is observed at slightly shorter distances than half the target distance $2d_t$=254 cm. This is due to the fact, that in the numerical simulations account was taken of the angle α=2.87 degrees, and of the finite dimensions of the electrodes instead of using point electrodes. It will be understood that it is sometimes convenient to use point electrodes in a theoretical description like in the book by Telfort et al. and in the discussion of FIGS. 1–5, however that in reality point electrodes do not exist. It will be clear that in reality a target distance of $2d_t$ will be suitably selected if the plane boundary is assumed to be positioned at a somewhat shorter distance than half the target distance; but one can still say that the target point has substantially the position of the mirror image of the monitoring electrode with respect to the assumed position of the plane.

It has been found that analogous results to the results discussed with reference to FIGS. 7 and 8 are obtained, if a target distance of $2d_t$=508 cm is used in the simulations, further using the same parameters about geometry and surroundings of the logging tool.

Further, it will be understood that the potential at the monitoring electrode can also be determined for the two cases that only one of the electrodes 61 and 62 is energized in the vicinity of a boundary. The potential due to energizing the electrodes simultaneously as shown in FIG. 8 can be calculated from the potentials determined for the two cases.

Therefore, the detection value of the potential at the monitoring electrode can also be determined from two measurements, wherein the electrodes 61 and 62 are energized one after the other, and wherein in each case the potential at the monitoring electrode is measured.

Returning again to the discussion of FIG. 6, it can further be desirable to determine the location in the borehole 57 at which the logging tool has a predetermined distance from the boundary 56. To this end the logging tool 60 can be passed from the location 65 to a different location (not shown) along the wellbore 57. The electrodes 61 and/or 62 can remain energized while the logging tool moves, or they can be energized again with the same currents when the new location is reached. At the new location the detection value of the potential at the monitoring electrode is measured again. This can be repeated for a number of locations in the wellbore, and the detection values at the different locations can be compared with each other.

The detection values can be suitably compared as a function of the location in order to determine the location where a characteristic change occurs. A characteristic change can for example be a maximum, a minimum, or, if the reference value of the monitoring parameter has been determined, a crossing of the reference value by detection value. In the present example, where the potential at the monitoring electrode 63 is monitored as a function of location while keeping the energizing currents of electrodes 61 and 62 constant, the characteristic change is the zero-crossing of the detection value minus the reference value. At the location of the logging tool in the wellbore where this zero-crossing is observed, the boundary can be reported to be present at the assumed position relative to this location.

In another application of the present invention it can be desired to determine the distance to a boundary from a certain location of the logging tool in the wellbore. This can be achieved by assuming a number of alternative positions of the boundary at different distances from the logging tool, selecting target points and target values of the parameter (e.g. the potential) corresponding to the alternative positions, and by repeating for each alternative position the steps of the method for the same location in the wellbore. For each of the positions a detection value and preferably a respective reference value is obtained, and the detection values can be compared in order to determine the assumed position at which a characteristic change occurs. The characteristic change can for example be the zero-crossing of the detection value minus the respective reference value of the potential at the monitoring electrode, as a function of the distance to the assumed boundary. The assumed position of the boundary where this zero-crossing is observed, can be reported to be the position of the boundary relative to the location of the logging tool.

An additional parameter that can be determined in specific embodiments of the present invention is the resistivity $\rho_2$ of the second (remote) formation region. When a number of detection values of the monitoring parameter are determined in the course of the downhole measurement, for example when measuring at a number of different locations of the logging tool in the wellbore or when using different assumed positions of the boundary at a fixed location of the logging tool, the detection values can be interpreted in order to estimate the resistivity $\rho_2$ of the second formation region.

As an example, reference is made to FIG. 8. In this Figure, the three curves of the potential at the monitoring electrode ($\Phi_{tot}^{mon} - \Phi_{hom}^{mon}$) vs. the distance to the boundary relate to different resistivities $\rho_2$ of the second formation region. Each curve represents the potential detected at the monitoring electrode if the boundary 56 in FIG. 6 is present near the logging tool, and if the tool is energized by the same currents at the electrodes 61 and 62 as given in Table 1.

In a practical case, once the distance to the boundary has been determined according to the invention, the measured detection values of the potential at the monitoring electrode can be plotted as a function of the distance to the boundary. When for example the difference between detection and reference values $\Phi_{tot}^{mon} - \Phi_{hom}^{mon}$ is plotted as in FIG. 8, the resistivity $\rho_2$ of the second formation region can then be derived from the slope of this function at the zero-crossing (i.e. at the distance where the detection value of the monitoring parameter crosses the reference value which the monitoring parameter would have in a homogeneous formation), taking the known resistivity $\rho_1$ of the first formation region into account.

When the actual value of the resistivity $\rho_2$ is not needed, the sign of the slope of this function (positive sign for a curve ascending with increasing distance to the boundary or negative sign for a descending curve) can be used to obtain information about the sign of the reflection coefficient $\gamma = (\rho_2 - \rho_1)/(\rho_2 + \rho_1)$, and thereby about the relative magnitude of the resistivities $\rho_1$ and $\rho_2$. The sign of the slope is equivalent to the sign of the first derivative of the curve.

It shall be clear that information about the resistivity $\rho_2$ of the second formation region can also be obtained from a number of measurements using different assumed positions of the boundary, from a fixed location of the logging tool in the wellbore. Preferably, target points along a straight line crossing the monitoring electrode are used. For each target point a detection value and a reference value of the monitoring parameter can be obtained. The measured data can for example be interpreted by plotting the difference between corresponding pairs of detection values and reference values as a function of the target distance, which results in a plot similar to FIG. 8. The function has a zero-crossing where the target distance equals about twice the actual distance to the boundary. From the slope of the function near the zero-crossing, or the sign thereof, the value of $\rho_2$, or the sign of the reflection coefficient $\gamma$, can be inferred, wherein account is taken of the known resistivity $\rho_1$.

The method of the present invention can be carried out using different monitoring parameters.

In one type of application, which has already been discussed hereinbefore, the monitoring parameter is the potential at the monitoring electrode. Suitably, the monitoring electrode in this case is a passive electrode.

Another suitable monitoring parameter can be the current at the monitoring electrode. In this case, the monitoring electrode is suitably an active electrode which can be energized by a monitoring current. It can be advantageous to choose the currents for energizing the logging tool for the homogeneous case such that the monitoring current vanishes, and to mark the respective potential at the monitoring electrode as the homogeneous potential. The boundary can then for example be detected by enforcing the homogeneous potential at the monitoring electrode by a monitoring current, and by passing the logging tool along the wellbore while searching for a zero-crossing of the monitoring current.

In the course of a measurement of the distance to the boundary it can be necessary to vary the relative strength of the currents at the energized electrodes. It can be useful in this case to determine a set of different reference values of the monitoring parameter separately. A suitable experimental way is the following. The tool is placed in the wellbore at a location where it is surrounded by a sufficiently large and homogeneous formation having the properties of the first formation region. The electrodes are energized, and the relative current strength is varied systematically. For example, if there are two energized electrodes, the current of one electrode is kept constant, and the current of the second is varied between say −0.2 to −2.0 times the first current. The range can depend on tool geometry, anticipated position and orientation of the boundary, and the resistivities of the first and second formation regions. The potential at the monitoring electrode is recorded as a function of the second current, and thereby a set of reference values for a range of relative current strengths of the energized electrodes is obtained. An alternative way to achieve the same result is to energize the two electrodes separately, wherein the current strength in each case is varied in a range. The potential at the monitoring electrode is measured repeatedly in both cases, and the reference values as a function of current strength ratio can be determined therefrom.

The relative current strength of the energized electrodes can also be continuously changed if the boundary is to be detected, for example while to tool is passed along the borehole.

In another variant of the application of the present invention, more than one target points are selected in the formation. For example it has been found, that boundary that is assumed to be oriented perpendicular with respect to the axis of the logging tool (and the wellbore) can be detected if 4 target points are selected approximately in the plane of the assumed boundary, and if the target value of the potential in the target points is the same. In order to be able to provide a certain potential value in four target points, the logging tool is preferably provided with at least four electrodes that can be energized.

It shall be clear that energizing of the electrodes in the method of the present invention can be done using direct current or alternating current, and that the monitoring parameter will generally reflect the energizing frequency. Preferably, a low frequency alternating current, for example having a frequency of 60 Hz or less can be used, which prevents net displacement of charge carriers and associated effects.

The monitoring electrode can suitably have the form of a button electrode or conventional current focusing electrode. This can be of advantage with regard to the angular orientation of the boundary.

The term wellbore is used in the specification and in the claims synonymous to the term borehole.

What is claimed is:

1. A method of detecting in an earth formation a boundary between a first formation region having a known resistivity and a second formation region having a different resistivity, wherein the first formation region is traversed by a wellbore filled with a fluid of known resistivity, using a logging tool provided with a number of electrodes including a monitoring electrode, which method comprises the steps of:

a) selecting a location of the logging tool in the wellbore;

b) assuming a position of the boundary relative to the selected location of the logging tool, selecting outside the wellbore one or more target points relative to the selected location, and selecting a target value for a selected parameter in each target point;

c) assuming a model wherein the logging tool in the wellbore is surrounded by an infinite and homogeneous formation having a resistivity which is equal to the known resistivity of the first formation region, and determining how at least two of the electrodes have to be energized in order that in each of the target points the selected parameter has the target value;

d) selecting a monitoring parameter at the monitoring electrode;

e) placing the logging tool at the selected location in the wellbore;

f) determining at the selected location a detection value of the monitoring parameter resulting from energizing the at least two electrodes as determined in step c); and g) interpreting the detection value of the monitoring parameter in order to detect the boundary.

2. The method according to claim 1, further comprising the steps of:

passing the logging tool through the wellbore;

selecting one or more additional locations of the logging tool longitudinally along the wellbore;

repeating step f) at each of the additional locations;

comparing the detection values of the monitoring parameter at the different locations and selecting the location of the logging tool at which a characteristic change occurs; and reporting the assumed position of the boundary relative to the selected location of the logging tool as the position of the boundary.

3. The method according to claim 1, further comprising the steps of:

assuming one or more alternative positions of the boundary relative to the selected location of the logging tool in the wellbore;

for each alternative position, repeating steps b), c) and f);

comparing the detection values of the monitoring parameter for the different positions and selecting the position of the boundary at which a characteristic change occurs; and reporting the selected position of the boundary relative to the selected location of the logging tool as the position of the boundary.

4. The method according to claim 1, wherein step d) further comprises determining the reference value of the monitoring parameter resulting from energizing the at least two electrodes as determined in step c) in a formation according to the model assumed in step c), and wherein step g) comprises comparing the detection value to the reference value in order to detect the boundary.

5. The method according to claim 4, wherein the assumed position of the boundary is reported as the position of the boundary relative to the logging tool at its location in the wellbore, if the detection value of the monitoring parameter substantially equals the reference value as determined in step d).

6. The method according to claim 1, wherein the detection value of the monitoring parameter is determined in step f) from a measurement wherein the at least two electrodes are energized simultaneously at the selected location.

7. The method of claim 1, wherein the detection value of the monitoring parameter is determined in step f) from a number of measurements, wherein in each measurement at least one of the at least two electrodes is energized.

8. The method according to claim 1, wherein the boundary is substantially a plane, and wherein one target point is selected at substantially the position of the mirror image of the monitoring electrode of the logging tool at its selected location, with respect to the assumed position of the plane.

9. The method according to claim 1, wherein the selected parameter at one of the target points is the potential.

10. The method according to claim 9, wherein the target value of the potential is zero Volt.

11. The method according to claim 1, wherein a number of detection values of the monitoring parameter are determined, at different locations of the logging tool or for different assumed positions of the boundary, wherein the method further comprises interpreting the detection values of the monitoring parameter in order to estimate the resistivity of the second formation region.

12. The method according to claim 11 when dependent on claim 4, wherein a number of detection values of the monitoring parameter are determined at different locations of the logging tool, further comprising the steps of representing the detection values of the monitoring parameter as a function of the distance to the boundary, and determining the sign of the reflection coefficient $\gamma=(\rho_2-\rho_1)/(\rho_2+\rho_1)$ from the sign of the derivative of the function near the distance to the boundary where the function crosses the reference value of the monitoring parameter, wherein $\rho_1,\rho_2$ denote the resistivities of the first and second formation region, respectively.

13. The method according to claim 11 when dependent on claim 4, wherein a number of detection values and reference values of the monitoring parameter are determined for different assumed positions of the boundary, further comprising the steps of representing the difference between corresponding detection values and reference values of the monitoring parameter as a function of the target distance, and determining the sign of the reflection coefficient $\gamma=(\rho_2-\rho_1)/(\rho_2+\rho_1)$ from the sign of the derivative of the function near the target distance where the function crosses through zero, wherein $\rho_1,\rho_2$ denote the resistivities of the first and second formation region, respectively.

* * * * *